US009457883B2

(12) United States Patent
Fieback et al.

(10) Patent No.: US 9,457,883 B2
(45) Date of Patent: Oct. 4, 2016

(54) REMOTE CONTROL ADAPTED TO RETROFIT ON A JET SKI

(71) Applicants: Tobias Fieback, Witten (DE); Lars Ramcke, Hamburg (DE); Svetlana Immel, Itzehoe (DE)

(72) Inventors: Tobias Fieback, Witten (DE); Lars Ramcke, Hamburg (DE); Svetlana Immel, Itzehoe (DE)

( * ) Notice: Subject to any disclaimer, the term of this patent is extended or adjusted under 35 U.S.C. 154(b) by 27 days.

(21) Appl. No.: 14/474,453

(22) Filed: Sep. 2, 2014

(65) Prior Publication Data

US 2015/0066249 A1 Mar. 5, 2015

(30) Foreign Application Priority Data

Sep. 3, 2013 (EP) .................................... 13182820

(51) Int. Cl.
  *B63H 21/21* (2006.01)
  *B63H 21/22* (2006.01)
  *B63H 11/00* (2006.01)
  *B63H 25/02* (2006.01)
  *B63B 35/73* (2006.01)
  *G05D 1/00* (2006.01)

(52) U.S. Cl.
  CPC ............. *B63H 21/21* (2013.01); *B63B 35/73* (2013.01); *B63H 11/00* (2013.01); *B63H 21/22* (2013.01); *G05D 1/0011* (2013.01); *G05D 1/0022* (2013.01); *B63H 2021/216* (2013.01); *B63H 2025/028* (2013.01)

(58) Field of Classification Search
  CPC ...... B63H 21/21; B63H 21/22; B63H 11/00; B63H 2021/216; B63H 2025/028; B63B 35/73; G05D 11/011; G05D 1/022
  See application file for complete search history.

(56) References Cited

U.S. PATENT DOCUMENTS

| 2,776,443 | A | * | 1/1957 | Howard | B63B 35/817 114/246 |
|---|---|---|---|---|---|
| 3,503,574 | A | * | 3/1970 | Eickmann | B64C 27/12 244/17.17 |
| 5,041,040 | A | * | 8/1991 | Jones | B63H 21/22 114/253 |
| 5,307,048 | A | * | 4/1994 | Sonders | B60R 25/04 180/287 |
| 5,861,799 | A | * | 1/1999 | Szwed | B60R 25/04 123/179.2 |
| 6,584,383 | B2 | * | 6/2003 | Pippenger | G05D 1/0061 340/990 |
| 6,712,173 | B2 | * | 3/2004 | Esselink | B62M 27/02 180/315 |
| 7,131,614 | B2 | * | 11/2006 | Kisak | B61L 15/0027 246/167 R |
| 7,258,301 | B2 | * | 8/2007 | Li | B63H 11/04 114/315 |
| 7,614,355 | B2 | * | 11/2009 | Zeyger | B63H 11/00 114/55.58 |

(Continued)

FOREIGN PATENT DOCUMENTS

GB 2424737 A * 10/2006 ............... B62H 7/00
WO 2007/067599 A1 6/2007

(Continued)

OTHER PUBLICATIONS

European Search Report of the Application No. EP13182820.4-1751 dated Feb. 11, 2014.

*Primary Examiner* — Dale W Hilgendorf
(74) *Attorney, Agent, or Firm* — Kelly & Kelley, LLP

(57) ABSTRACT

A remote operating device for remotely operating a floating device having a water jet drive includes a first operating unit for receiving control data as well as an actuator for controlling and/or adjusting the power of the water jet drive. The actuator may include a first actuating element for mechanically controlling the power of the water jet drive of the floating device. Alternatively, the actuator may include a first electronic module for feeding a voltage signal into engine electronics of the floating device, for controlling the power of the water jet drive.

24 Claims, 6 Drawing Sheets

(56) References Cited

U.S. PATENT DOCUMENTS

| | | | | |
|---|---|---|---|---|
| 7,628,239 B1* | 12/2009 | Louie | ............... | B62D 1/00 |
| | | | | 701/36 |
| 7,837,143 B2* | 11/2010 | Matos | ............... | B64C 13/24 |
| | | | | 244/75.1 |
| 2004/0107028 A1* | 6/2004 | Catalano | ............... | G05D 1/0061 |
| | | | | 701/2 |
| 2005/0085141 A1 | 4/2005 | Motose | | |
| 2005/0124234 A1* | 6/2005 | Sells | ............... | B63H 21/24 |
| | | | | 440/33 |
| 2008/0288142 A1* | 11/2008 | Ewert | ............... | B60T 7/02 |
| | | | | 701/48 |
| 2012/0060738 A1* | 3/2012 | Sells | ............... | B63H 21/22 |
| | | | | 114/144 A |
| 2014/0150702 A1* | 6/2014 | Sells | ............... | B63H 21/22 |
| | | | | 114/144 A |

FOREIGN PATENT DOCUMENTS

| | | |
|---|---|---|
| WO | 2011/100654 A2 | 8/2011 |
| WO | 2013/041787 A1 | 3/2013 |

\* cited by examiner

REMOTE CONTROL ADAPTED TO RETROFIT ON A JET SKI

FIELD OF THE INVENTION

The invention relates to a remote operating device for remotely operating a floating device comprising a water jet drive for generating a water jet. The remote operating device thereby consists of a first operating unit for receiving the control data as well as of at least one actuator for controlling and/or adjusting a power of the water jet drive as well as preferably for controlling and/or adjusting further functions of the floating device. This allows for remotely operating a floating device, for example a jet ski, from an arrangement, which is spaced apart from the floating device, for example from a water jet-driven piece of sports equipment.

BACKGROUND OF THE INVENTION

For example, a piece of water sports equipment is known from U.S. Pat. No. 7,258,301 B2, which consists of a specific boat unit as well as of an external flying unit. The boat unit draws in water via a high-performance pump and transfers it to the flying unit via a hose. This flying unit can also be strapped to the back of a person. The water drawn in by the boat unit is transferred as water jet via the hose to the flying unit. The water jet is ejected again via two manually controllable nozzles at the flying unit. Due to the repulsive effect, the person soars, depending on the position of the nozzles and adjusted power of the high-power pump.

A water jet deflecting device, which consists of a tube system, for connecting to a jet ski is known from WO 2013041 787 A1. The external flying unit can be connected to a commercial jet ski by means of this water jet deflecting device.

To control the power of the water jet drive of the boat unit or of the jet ski from the external flying unit, the use of a very long, for example at least 10 meters long Bowden cable, is known. Such a Bowden cable can be arranged at the hose between the external flying unit and the boat unit or the jet ski, for example. At the boat unit or the jet ski, the long Bowden cable can be connected to the accelerator, to a Bowden cable of the boat unit or of the jet ski connected to the accelerator or directly to the butterfly control valve in the intake section of the engine of the boat unit or of the jet ski. For example, the external flying unit can thus control the acceleration function at the boat unit or the jet ski via the mechanical Bowden cable.

However, it is disadvantageous that the mechanical arrangement is very sluggish when using such a long Bowden cable and often leads to a jamming, for example, so that the gas no longer goes back independently, for example. Such an arrangement furthermore requires frequent and extensive maintenance.

Accordingly, there is a need for a remote operating device for remotely operating a floating device comprising a water jet drive, which is embodied in such a flexible manner that it can be operated without extensive retrofitting measures at known floating devices comprising a water jet drive, for example jet skis or jet boats, and is less error-prone as well as more robust than the solution known from the state of the art.

SUMMARY OF THE INVENTION

In accordance with the present invention, a remote operating device for remotely operating a floating device comprising a water jet drive for generating a water jet is proposed according to the invention, wherein the remote operating device encompasses a first operating unit for receiving control data as well as at least one actuator for controlling and/or adjusting the power of the water jet drive as well as preferably for controlling and/or adjusting further functions of the floating device. The first operating unit encompasses an emitter for transmitting the control data. In contrast, the actuator encompasses a receiver for receiving the control data transmitted by the emitter.

The floating device comprising a water jet drive for generating a water jet can be any suitable floating device comprising a water jet drive. Preferably, the floating device is a floating device for passenger transportation. For example, it is a jet ski or a jet boat. An external device, for example a water jet-driven piece of sports equipment, can be connected to the floating device, for example a jet ski, via a long, for example approx. 10 meters long hose, by means of a water jet deflecting device. For this purpose, the hose is typically connected to the outlet nozzle for the water jet or to the water jet deflecting device, respectively, which is arranged at the outlet nozzle for the water jet.

The water jet deflecting device serves to connect the external device to a floating device in a flexible manner, without requiring larger retrofitting measures at the floating device. By means of the water jet deflecting device, the water jet, which is ejected backwards by the floating device, is received, is preferably deflected upwards and is preferably guided above the water surface along an outer surface of the floating device to the bow area of the floating device. In the bow area, the water jet deflecting device can be connected to the hose for connecting the external device. Preferably, the water jet deflecting device substantially encompasses pipes and/or hoses for deflecting and transferring the water jet.

The first operating unit for receiving the control data can preferably be or is arranged, respectively, so as to be spaced apart from the floating device. For example, the first operating unit for receiving control data can be arranged at the external device, for example the water jet-driven piece of sports equipment. From the water jet-driven piece of sports equipment, a person can thus specify control data via the first operating unit. Said control data are then received and processed by the actuator, which is preferably arranged at the floating device. For this purpose, the first operating unit can encompass a throttle, preferably a handle, which is embodied as twist throttle. Via the latter, a person can specify the desired power of the water jet drive of the floating device at the water jet-driven piece of sports equipment. Preferably, further control data, in particular start/stop, emergency stop, selection of a driving mode and/or further functions can be specified at the first operating unit via sensors or digital or analog adjusting functions, respectively.

According to the invention, the actuator encompasses a first actuating element for mechanically operating a means, which is assigned to the floating device, for controlling the power of the water jet drive of the floating device. The means for controlling the power of the water jet drive, which is arranged at the floating device in any event, can thus be operated by means of the first actuating element of the actuator.

As an alternative to the first actuating element for mechanically operating a means, which is assigned to the floating device, for controlling the power of the water jet drive, the actuator can encompass a first electronic module for feeding a signal into an engine electronics, which is assigned to the floating device, for controlling the power of the water jet drive of the floating device. Instead of a mechanical operation, an electric signal, in particular a voltage signal, can be fed into the engine electronics, which is assigned to the floating device through this.

Other features and advantages of the present invention will become apparent from the following more detail description, taken in conjunction with the accompanying drawings which illustrate, by way of the example, the principles of the invention.

BRIEF DESCRIPTION OF THE DRAWINGS

The invention will now be explained in an exemplary manner with reference to the accompanying drawings by means of particularly preferred embodiments.

DETAILED DESCRIPTION OF THE PREFERRED EMBODIMENTS

Figure 1:
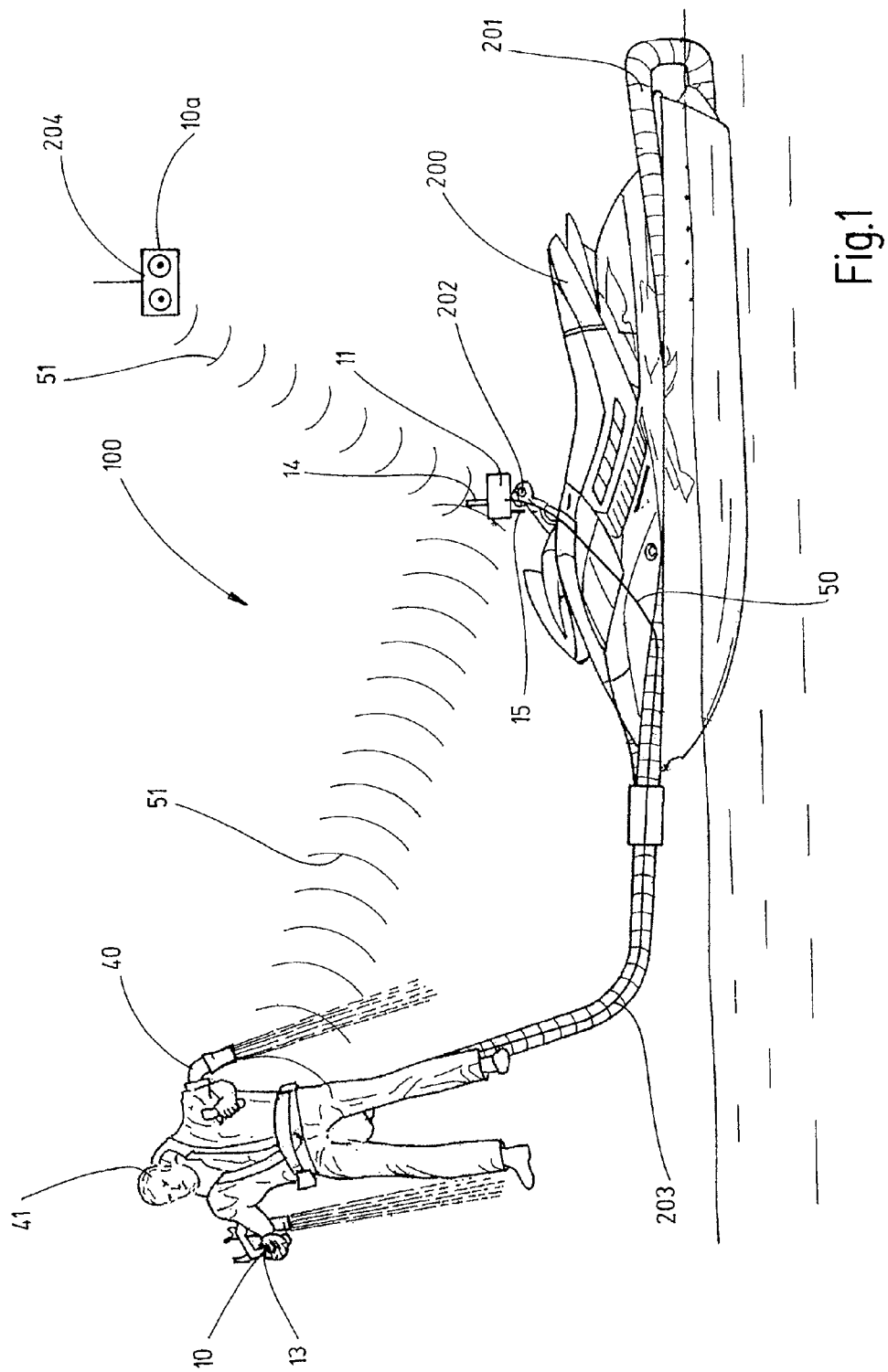
FIG. 1 shows a schematic view of a water jet-driven piece of sports equipment, which is connected via a hose to a floating device, namely a jet ski, comprising a remote operating device.

FIG. 1 shows a remote operating device 100 for remotely operating a floating device 200, namely a jet ski, comprising a water jet drive. The remote operating device 100 thereby comprises substantially two units, a first operating unit 10 and an actuator 11. The first operating unit 10 is arranged at a water jet-driven piece of sports equipment 40 and serves to receive control data by a person 41. The actuator 11 is arranged at the floating device 200, namely at the handle 202 of the floating device 200. The actuator 11 serves to control and adjust a power of the water jet drive of the floating device 200.

The water jet-driven piece of sports equipment is connected to the outlet nozzle of the floating device 200 by means of a long, approx. 10 m long hose 203 via a water jet deflecting device 201. The floating device draws in water from below and conveys said water backwards in the form of a water jet through the outlet nozzle via the water jet deflecting device 201 through the hose 203 to the water jet-driven piece of sports equipment 40. At the water jet-driven piece of sports equipment 40, the water jet is ejected downwards in two parts. The person 41 can thus lift off from the water surface with the water jet-driven piece of sports equipment 40. The power of the water jet and thus the speed and acceleration, which the person 41 can reach with the water jet-driven piece of sports equipment 40, depends substantially on the power of the water jet drive of the floating device 200. The power of the water jet drive of the floating device 200 is typically controlled and specified at the floating device, namely a jet ski, by means of an accelerator 206 at the handle 202.

The actuator 11 of the remote operating device 100 is attached to the handle 202 of the floating device 200 by means of a first releasable connecting means 17, namely by means of clamps. The actuator 11 further encompasses an actuating motor 20 and a first actuating element 15, which is connected to the actuating motor 20. The first actuating element 15 is embodied as rigidly embodied finger in the form of a smaller rod and serves the purpose of operating the accelerator 206. The lift or the actuating path, respectively, for the accelerator 206 and thus the desired power of the water jet drive of the floating device 200 is specified by the actuating motor 20.

A receiver 14 is arranged at the actuator 11. This receiver 14 receives the control data from an emitter 13, which is arranged at the first operating unit 10. A rotatable throttle 60 is arranged at the first operating unit 10. By means of the rotatable throttle 60, the person 41 can specify the desired power level of the water jet drive for the floating device 200. These control data are received by the first operating unit 10 and are sent as control data via the emitter 13. Based on the control data received by the receiver 14, the power of the water jet drive of the floating device 200 is controlled by the actuator 11 at the floating device 200. The connection between emitter 13 and receiver 14 can be embodied as radio contact 51 or as cable connection 50, for example as BUS system.

FIG. 1 furthermore shows a second operating unit 10a in the form of a trainer remote control 204. The second operating unit 10a is connected to the actuator 11 via a radio contact 51. The power of the water jet drive of the floating device 200 can be controlled remotely via the second operating unit 10a as via the first operating unit 10. In addition, further functions can be controlled remotely. The second operating unit 10a encompasses a higher priority as compared to the first operating unit 10.

Figure 2:
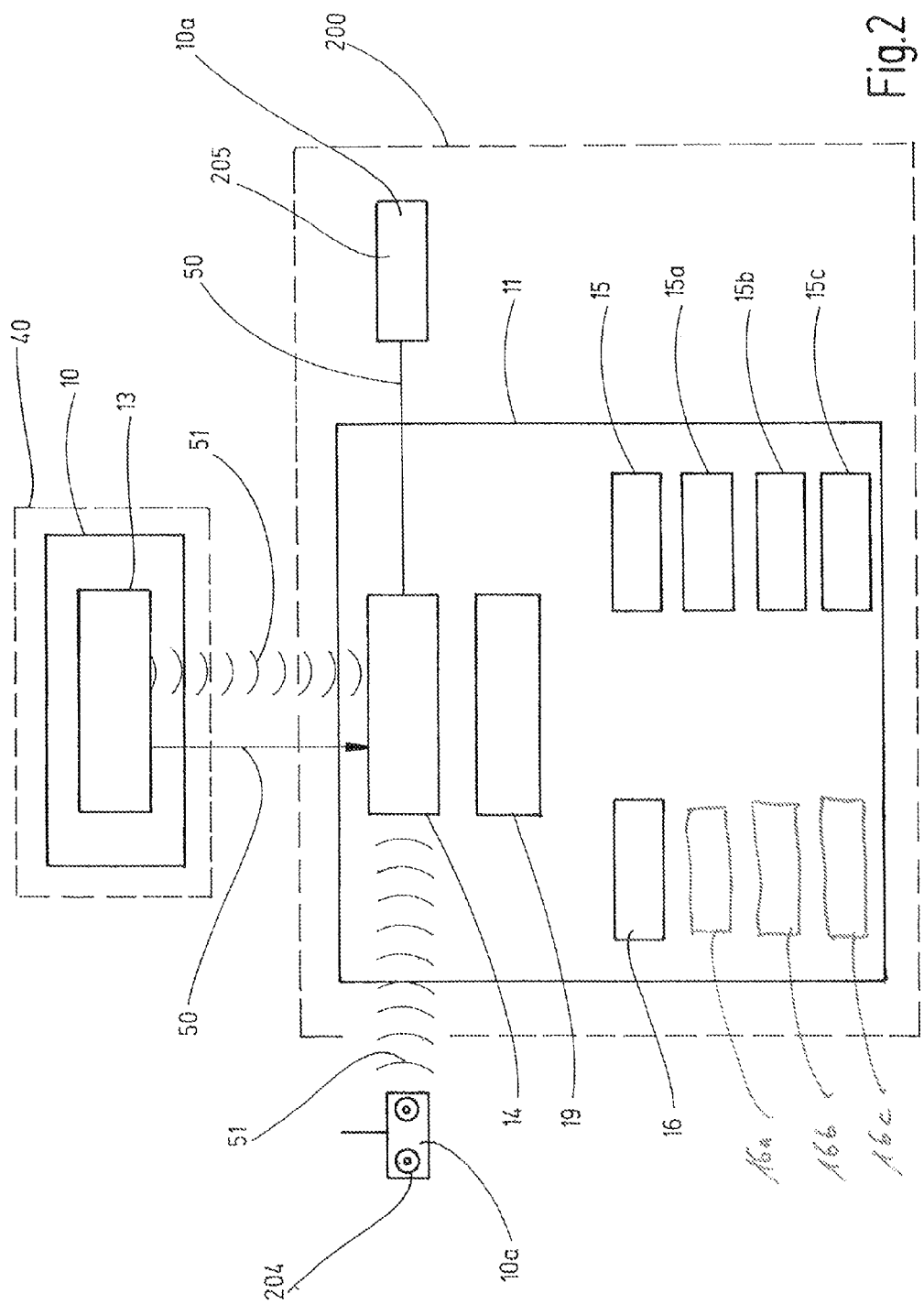
FIG. 2 shows a diagram of a design of the individual functions of a remote operating device.

FIG. 2 shows a diagram comprising the modules of the remote operating device 100. The first operating unit 10 comprising the emitter 13 is arranged at the water jet-driven piece of sports equipment 40. This emitter 13 sends the control data, which are received by the first operating unit 10, via a cable connection 50 or a radio contact 51 to the receiver 14 in the actuator 11, which is arranged at the floating device 200. The control data are processed by the electronics 19 in the actuator 11. Based on these data, the first actuating element 15 is actuated to mechanically operate the accelerator 206 of the floating device 200 by means of an actuating motor 20. As an alternative to the mechanical operation of the accelerator 206 by means of the first actuating element 15, the desired power of the water jet drive of the floating device 200 can be adjusted via the first electronic module 16 and a signal can be fed into the engine electronics for this purpose for controlling the power of the water jet drive of the floating device.

In addition to controlling the power of the water jet drive of the floating device 200, a start function, stop function, emergency stop function and the driving mode of the floating device 200, for example, can be operated and selected via the remote operating device 100. The control of these additional functions can either be made via further electronic modules 16, 16a, 16b, 16c or via a second actuating element 15a, a third actuating element 15b and a fourth actuating element 15c by mechanically operating corresponding levers and switches or buttons at the floating device 200.

In addition to the first operating unit 10, provision is made for a second operating unit 10a in the form of a trainer remote control 204 or of a trainer module 205. Provision can simultaneously also be made for a trainer remote control 204 as well as for a trainer module 205. By means of this second operating unit 10a, namely the trainer remote control 204 and the trainer module 205, control data for controlling the power of the water jet drive of the floating device 200 as well as for actuating further functions can be sent to the actuator 11. The data can be sent, for example, from a trainer remote control 204 via a radio contact 51 to the actuator 11. A trainer module 205 could furthermore be connected to the actuator 11 or to the receiver 14 of the actuator 11, respectively, by means of a cable connection 50. Such a trainer module 205 can thus be arranged at the floating device 200.

The power of the water jet drive of the floating device 200 as well as the additional functions can be controlled completely by means of such a second operating unit 10a. Individual functions can furthermore be released for the first operating unit 10. A decision can thus optionally be made during the instructing or during a training operation, which functions of the water jet-driven piece of sports equipment 40 can be controlled independently by the person 41 via the first operating unit 10, and which functions can only be controlled via the second operating unit 10a by a different person, for example a trainer. In addition, specifications, such as the limitation of the maximum power of the water jet drive of the floating device 200 as well as of the maximum acceleration or delay of the water jet drive, for example, can be specified via the second operating unit 10a. On the one hand, this significantly increases the flexibility, because these specifications do not need to be made at the main electronics of the floating device 200, but can be specified in a simple manner by the second operating unit 10a, for example the trainer remote control 204 or the trainer module 205, and can be changed in a simple manner. The safety can furthermore be increased significantly through this.

Figure 3:
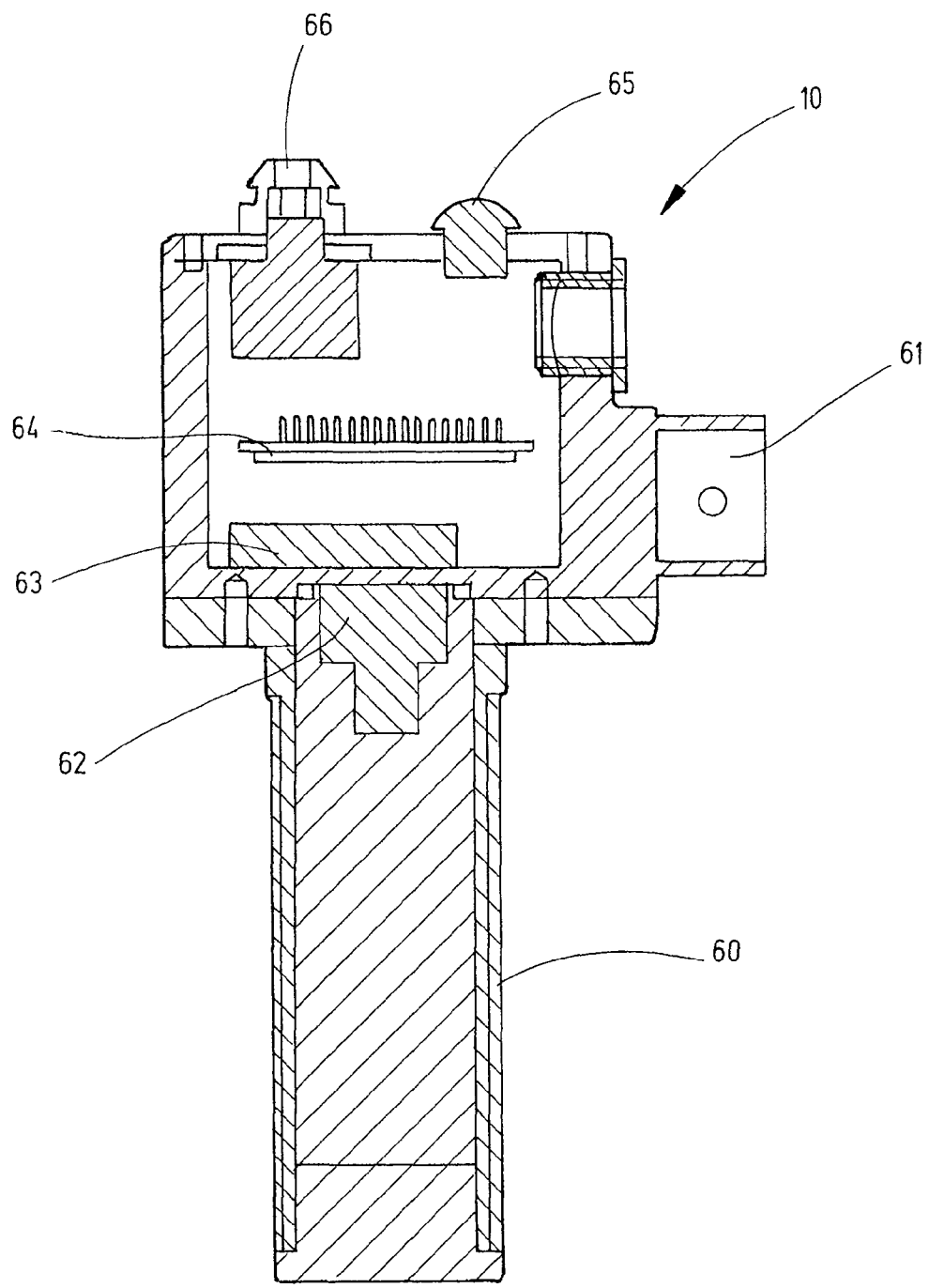
FIG. 3 shows a schematic view of an operating unit for a remote operating device.

FIG. 3 shows the first operating unit 10, which is typically arranged at the water jet-driven piece of sports equipment 40 and which is operated by a person 41. The first operating unit 10 thereby encompasses a rotatable accelerator 60 for adjusting the desired power of the water jet drive of the floating device 200. The adjustment made at the rotatable accelerator 60 is identified by the magnet 62 and the Hall sensor 63, is converted into a voltage signal and is transferred to a microcontroller 64. The microcontroller 64 serves to process the data as well as to control the respective inputs and outputs. The first operating unit 10 encompasses a receiving device 61 for the water jet-driven piece of sports equipment 40 and can be connected to the latter via this. Buttons for controlling the further functions, namely a start/stop button 65, and an emergency stop button 66, and a drive mode selection button are furthermore arranged at the first operating unit 10.

Figure 4:
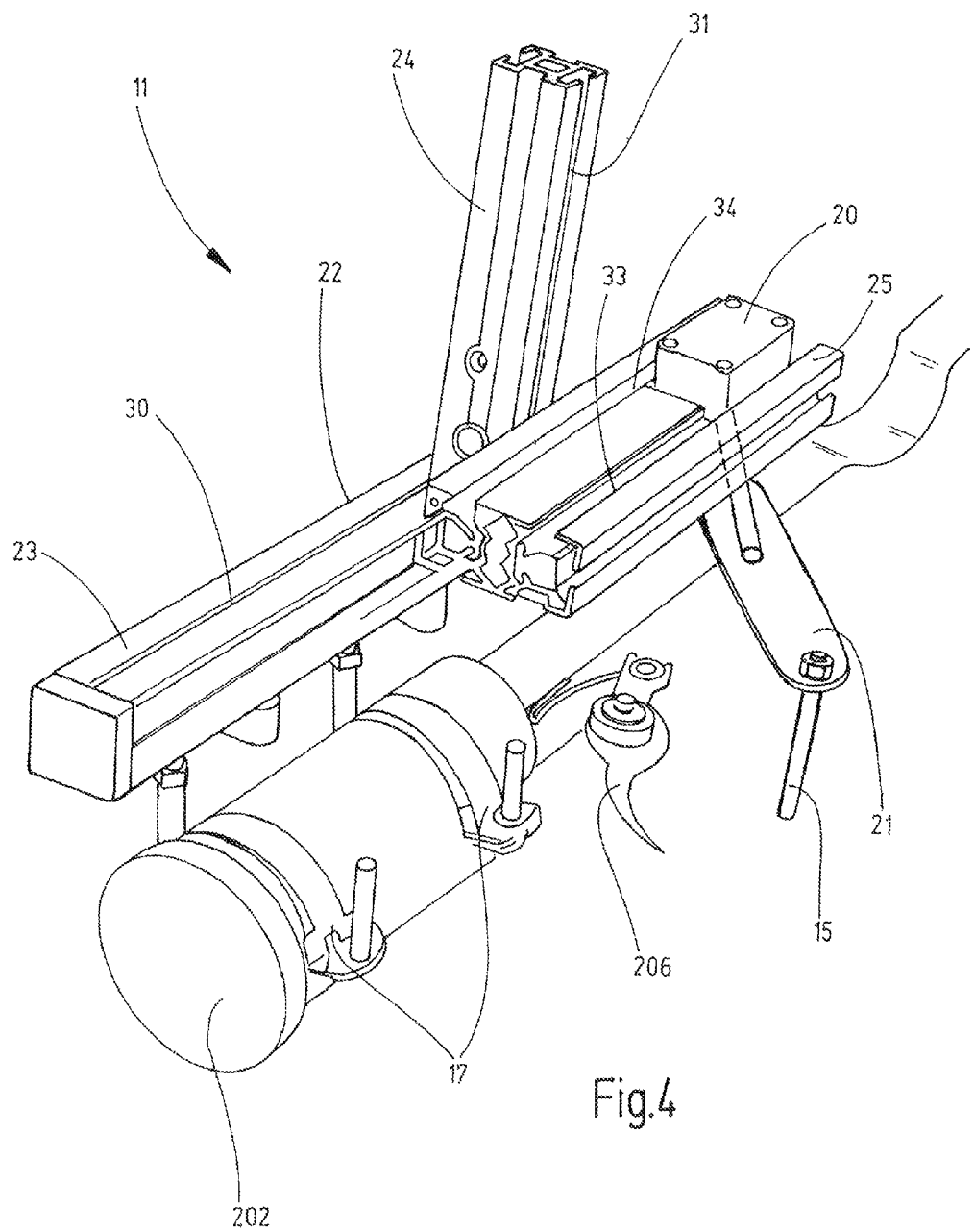
FIG. 4 shows a schematic view of an actuator comprising a mechanical holder of a remote operating device.

FIG. 4 shows the actuator 11. The actuator 11 is arranged at the handle 202 of the floating device 200 by means of a first releasable connecting means 17, namely by means of clamps. The actuator 11 encompasses a first mechanical holder 22 for holding the actuating motor 20. A first actuating element 15 in the form of a rigid finger is connected to the actuating motor 20. A compressive force can be exerted on the accelerator 206 via this and the power of the water jet drive of the floating device 200 can thus be controlled.

The first mechanical holder 22 consists of a first support profile 23, a second support profile 24 and a third support profile 25. The first releasable connecting means 17, namely the clamps, for connecting the first mechanical holder 22 to the floating device 200 is arranged at the first support profile 23. In response to arranging the first mechanical holder 22 at the handle 202 of the floating device 200, the first support profile 23 is arranged substantially parallel to the handle 202 of the floating device 200. By means of the first releasable connecting means 17, the first mechanical holder 22 can be turned around the handle 202 and can be adjusted, if necessary. The second support profile 24 is arranged substantially vertically to the first support profile 23. The second support profile 24 is thereby placed with a front side on a longitudinal side of the first support profile and is connected to the first support profile 23 by means of a first support profile connecting means 26. On the longitudinal side, the first support profile 23 encompasses a first groove 30. The first support connecting means 26 is inserted with a pin into the front side of the second support profile 24 and is inserted into the first groove 30 with the disk-shaped head. In longitudinal of the first support profile 23, the second support profile 24 can thus be displaced along the first groove 30. By means of a latching, the second support profile 24 can be fixed. The first support profile connecting means 26 is furthermore embodied such that the second support profile 24 is arranged so as to be rotatable about its longitudinal axis 35. This position can also be fixed by means of a latching.

The third support profile 25 serves as support for the actuating motor 20. On a longitudinal side, the second support profile 24 encompasses a second groove 31. At a longitudinal side, the third support profile 25 also encompasses a groove, namely a third groove 32. In the area of the second groove 31 and third groove 32, the second support profile 24 is connected to the third support profile 25 by means of a second support profile connecting means 27. The second support profile 24 and the third support profile 25 is thereby displaceably connected by means of the second support profile connecting means 27 in longitudinal direction of the second support profile 24 along the second groove 31. The third support profile 25 is furthermore connected to the second support profile 24 so as to be rotatable about its transverse axis 36.

Due to the displaceability of the individual support profiles 23, 24, and the embodiment of the first support profile connecting means 26 and second support profile connecting means 27 as rotatable connecting means as well as by providing the first releasable connecting means 17, the first mechanical holder 22 can be adapted to every common jet ski or to every common floating device 200, respectively, comprising a water jet drive, and to the different dimensions thereof. For example, the first mechanical holder 22 can be arranged accordingly as a function of whether the accelerator 206 is provided as finger-operated accelerator or as thumb-operated accelerator. The incline of the first actuating element 15 can furthermore be adapted and adjusted at the floating device 200 in accordance with the arrangement and dimensions of the handle 202. The distances between handle 202 and accelerator 206 can also be considered and adjusted. The actuator 11 can thus be attached and connected to every floating device 200 comprising a water jet drive, in particular every jet ski or every jet boat by means of the first mechanical holder 22, without requiring retrofitting measures at the floating device 200.

Figure 5:
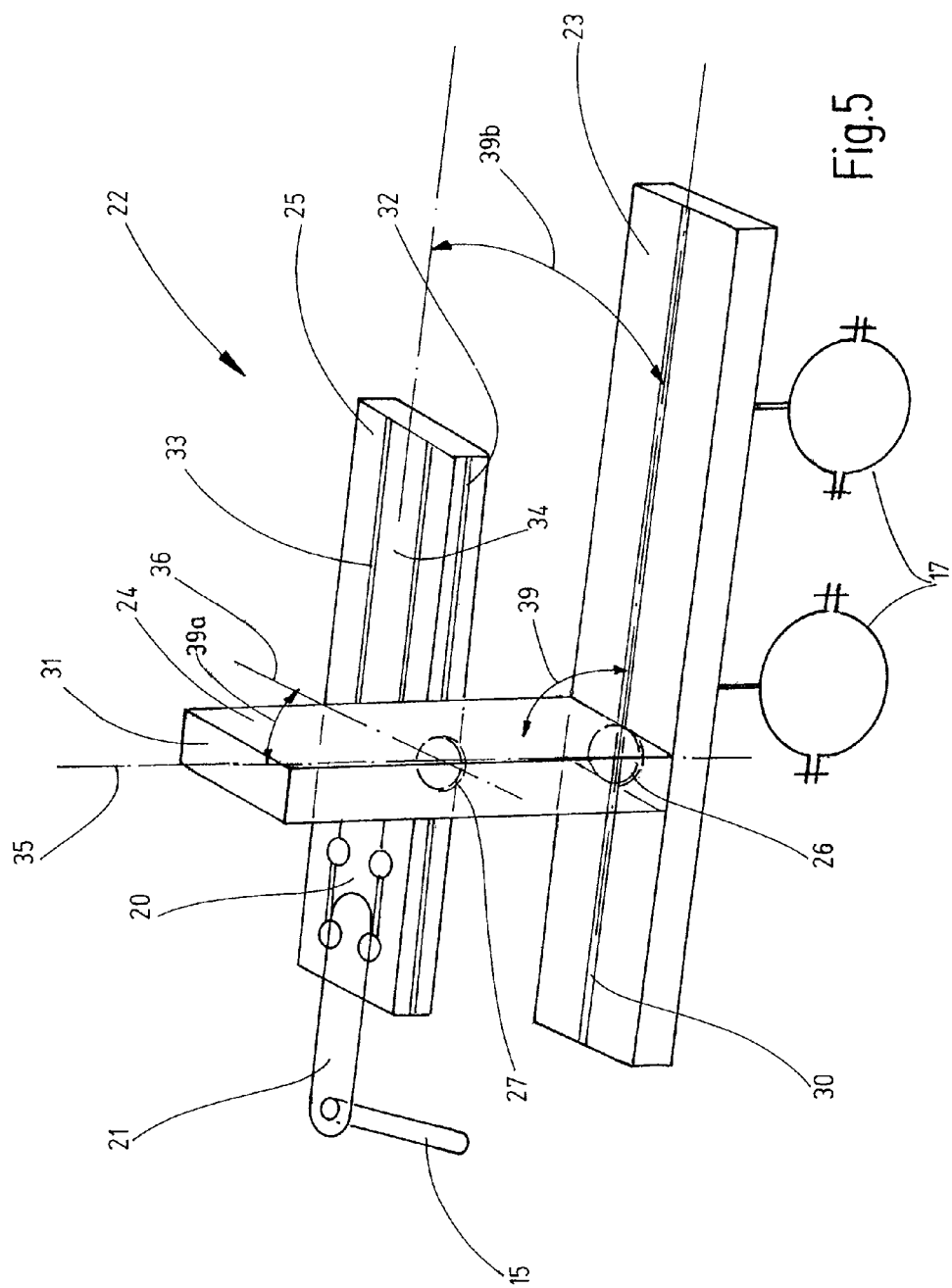
FIG. 5 shows a schematic view of a mechanical holder of an actuator of a remote operating device.

FIG. 5 shows once again the first mechanical holder 22 consisting of first support profile 23, a second support profile 24 and a third support profile 25 as well as the embodiment of the three support profiles 23, 24, 25. In particular, the displaceable arrangement of the individual support profiles 23, 24 and 25 is shown in FIG. 5. The first support profile connecting means 26 and the second support profile connecting means 27 as well as the longitudinal axis 35 of the second support profile 24 and the transverse axis 36 of the third support profile 25 are furthermore shown. The two support profile connecting means 26, 27 are embodied as pin-shaped connectors comprising a circular diameter and a disk-shaped head. The pin-shaped connector is in each case introduced into the profile and its disk-shaped head can be inserted into the respective groove 30, 32 of the support profile 23, 25, which is to be connected.

Two grooves, which are arranged in parallel to one another, namely a fourth groove 33 and a fifth groove 34 are arranged at a longitudinal side of the third support profile 25. The actuating motor 20 is arranged between these grooves 34, 35 and is connected to the third support profile 25. The first actuating element 15 is connected to the actuating motor 20 via an arm 21.

The angle 39 between the first support profile 23 and the second support profile 24 is substantially 90°. The angle 39a between the second support profile 24 and the third support profile 25 can be varied between 0° and 180°. The angle 39b between the first support profile 23 and the third support profile 25 can also be varied between 0° and 180°.

Figure 6:
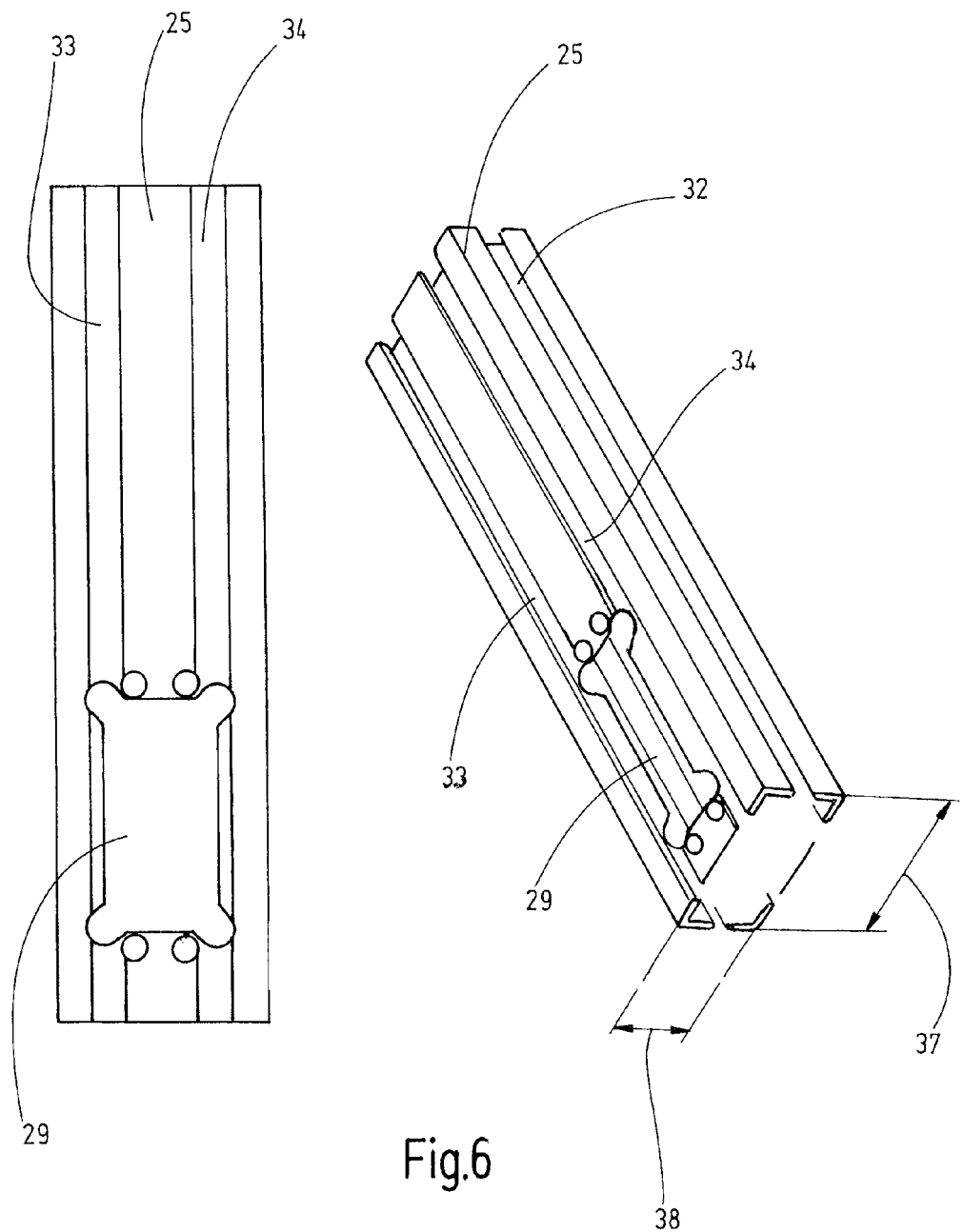
FIG. 6 shows a schematic view of a third support profile of a mechanical holder of the actuator.

FIG. 6 shows a perspective view of the third support profile 25 as well as a top view onto the third support profile 25. The third support profile 25 encompasses a width 37 of 40 mm and a height 38 of 20 mm. The third groove 32 is arranged along the narrower longitudinal side of the third support profile 25 so as to connect to the second support profile 24 by means of the second support profile connecting means 27. The fourth groove 33 and the fifth groove 34 are arranged substantially parallel to one another at a wider longitudinal side. Provision is furthermore made in a side area at the wider longitudinal side of the third support profile 25 for a through hole 29 for receiving the actuating motor 20.

Accordingly, in view of the foregoing it would be appreciated that the present invention provides a remote operating device for remotely operating a floating device comprising a water jet drive, which is embodied in such a flexible manner that it can be operated without extensive retrofitting measures at known floating devices comprising a water jet drive, for example jet skis or jet boats, and is less error-prone as well as more robust than the solution known from the state of the art.

According to this, a remote operating device for remotely operating a floating device comprising a water jet drive for generating a water jet is proposed according to the invention, wherein the remote operating device encompasses a first operating unit for receiving control data as well as at least one actuator for controlling and/or adjusting the power of the water jet drive as well as preferably for controlling and/or adjusting further functions of the floating device. The first operating unit encompasses an emitter for transmitting the control data. In contrast, the actuator encompasses a receiver for receiving the control data transmitted by the emitter.

The floating device comprising a water jet drive for generating a water jet can be any suitable floating device comprising a water jet drive. Preferably, the floating device is a floating device for passenger transportation. For example, it is a jet ski or a jet boat. An external device, for example a water jet-driven piece of sports equipment, can be connected to the floating device, for example a jet ski, via a long, for example approx. 10 meters long hose, by means of a water jet deflecting device. For this purpose, the hose is typically connected to the outlet nozzle for the water jet or to the water jet deflecting device, respectively, which is arranged at the outlet nozzle for the water jet.

The water jet deflecting device serves to connect the external device to a floating device in a flexible manner, without requiring larger retrofitting measures at the floating device. By means of the water jet deflecting device, the water jet, which is ejected backwards by the floating device, is received, is preferably deflected upwards and is preferably guided above the water surface along an outer surface of the floating device to the bow area of the floating device. In the bow area, the water jet deflecting device can be connected to the hose for connecting the external device. Preferably, the water jet deflecting device substantially encompasses pipes and/or hoses for deflecting and transferring the water jet.

The first operating unit for receiving the control data can preferably be or is arranged, respectively, so as to be spaced apart from the floating device. For example, the first operating unit for receiving control data can be arranged at the external device, for example the water jet-driven piece of sports equipment. From the water jet-driven piece of sports equipment, a person can thus specify control data via the first operating unit. Said control data are then received and processed by the actuator, which is preferably arranged at the floating device. For this purpose, the first operating unit can encompass a throttle, preferably a handle, which is embodied as twist throttle. Via the latter, a person can specify the desired power of the water jet drive of the floating device at the water jet-driven piece of sports equipment. Preferably, further control data, in particular start/stop, emergency stop, selection of a driving mode and/or further functions can be specified at the first operating unit via sensors or digital or analog adjusting functions, respectively.

According to the invention, the actuator encompasses a first actuating element for mechanically operating a means, which is assigned to the floating device, for controlling the power of the water jet drive of the floating device. The means for controlling the power of the water jet drive, which is arranged at the floating device in any event, can thus be operated by means of the first actuating element of the actuator.

As an alternative to the first actuating element for mechanically operating a means, which is assigned to the floating device, for controlling the power of the water jet drive, the actuator can encompass a first electronic module for feeding a signal into an engine electronics, which is assigned to the floating device, for controlling the power of the water jet drive of the floating device. Instead of a mechanical operation, an electric signal, in particular a voltage signal, can be fed into the engine electronics, which is assigned to the floating device through this.

By providing an actuator comprising a first actuating element for mechanically operating a means, which is assigned to the floating device, for controlling the power of the water jet drive, the remote operating device can be used at already known floating devices comprising water jet drive, for example jet skis or jet boats, without requiring larger retrofitting measures at the floating device. This also applies for the provision of a first electronic module for feeding a signal into an engine electronics, which is assigned to the floating device, for controlling the power of the water jet drive of the floating device, because only a plug-in connection needs to typically be disconnected at the floating device and needs to be connected to the first electronic module. This plug-in connection can be removed completely and without any large effort at any time and extensive maintenance work is also not necessary in both cases.

Preferably, the means, which is assigned to the floating device, for controlling the power of the water jet drive of the floating device, is embodied as handle, in particular as throttle, or as lever, in particular as accelerator. Typically, jet skis encompass an accelerator, which is designed as finger-operated accelerator or as thumb-operated accelerator. The desired power of the water jet drive of the floating device, for example of the jet ski, is thus specified or adjusted, respectively, by pressing the accelerator. Provision if furthermore preferably made for the means, which is assigned to the floating device, for controlling the power of the water jet drive of the floating device, to either be embodied as mechanical-electrical conversion element, in particular as Hall sensor, for generating a control voltage for the engine control electronics or as movable machine element for transferring a mechanical movement. For example, the movable machine element can be a Bowden cable. In this case, the desired power of the water jet drive of the floating device is specified or adjusted, respectively, for example by exerting a tractive force at the Bowden cable.

It is furthermore preferred for the means, which is assigned to the floating device, for controlling the power of the water jet drive of the floating device, to comprise a lever, in particular accelerator, as well as a movable machine element for transferring the mechanical movement, in particular a Bowden cable. By operating the lever, for example the accelerator, a tractive force can thus be exerted on the Bowden cable. In addition, the means, which is assigned to the floating device, for controlling the power of the water jet drive of the floating device, can comprise a lever, in particular accelerator, as well as a mechanical-electrical conversion element, in particular a Hall sensor, for generating a control voltage for the engine control electronics. By operating the accelerator, for example, the mechanical-electrical conversion element can thus be operated, wherein the mechanical-electrical conversion element converts the accelerator movement or the resulting accelerator position, respectively, into a voltage signal for the engine control electronics.

The emitter and receiver are preferably embodied for a cable connection or for a radio contact. When using a cable connection, a cable can be attached and fastened at the hose between the floating device and the water jet-driven piece of sports equipment, for example. The control data can be transmitted in analogous or digital form via the cable connection. Provision is preferably furthermore made for the cable to comprise a single wire connection or, in a particularly preferred manner, a plurality of wires. For example, the cable connection between emitter and receiver could be embodied as BUS system for transmitting BUS signals.

In response to the use of a radio contact between emitter and receiver, the control data are transmitted between emitter and receiver in a suitable manner, in particular in a preferred manner within the 40 MHz range.

Provision is furthermore made in a preferred manner for the actuator to encompass an electronics, for example a main electronics, for processing the control data received from the receiver. The electronics of the actuator thus serves as so-called control center. Various functions can be processed via this. For example, this can be the calibration of received signals, for example analog signals, as well as the calibration of mechanical arrangements or engines, for example a servomotor. Functions, such as the limitation of the maximum power of the water jet drive of the floating device and/or the limitation of the maximum acceleration or delay, for example, can be adjusted and processed via this. For this purpose, the electronics of the actuator preferably encompasses a printed circuit board comprising electronic components and a microcontroller as well as a software. The microcontroller can thereby be arranged on the printed circuit board of the electronics of the actuator.

The electronics can furthermore encompass a display means, for example a screen, as well as input means, for example buttons, switches and interfaces for connecting other input devices. For example, it is thus possible for the currently set functions to be displayed by means of the electronics of the actuator. As an alternative or in addition to the display via a monitor, the electronics can encompass a module for a remote display, for example for transmitting the information, which is to be displayed. All of the functions can thus be displayed and monitored at any time on a computer, which is arranged so as to be spaced apart from the actuator, or also at the first operating unit and/or a second operating unit. Functions can also be specified directly via the electronics or via input means of the electronics, respectively. The input of the functions can also be embodied as remote adjusting module. The adjustment can thus be made by a computer, which is arranged so as to be spaced apart from the actuator, or also by the first operating unit and/or a second operating unit. It is also preferred for the electronics to comprise the receiver of the actuator.

The control data encompass information relating to the power of the water jet drive of the floating device, which is to be adjusted. Preferably, the control data additionally encompass information relating to a start function and/or a stop function and/or an emergency stop function and/or a change between different modes, in particular driving modes, of the floating device. The first operating unit can thus not only receive control data relating to the desired power of the water jet drive of the floating device, but additional functions can also be controlled. It is thus possible, for example, to start and/or to stop the water jet drive of the floating device at the first operating unit by means of suitable input means, for example buttons or switches. In case of emergency, the water jet drive of the floating device can be turned off by the first operating unit via an emergency stop function. Due to the fact that modern jet skis or jet boats have different modes, for example different driving modes, provision is further more preferably made for such modes to be able to be selected and adjusted via the first operating unit. The different driving modes can be a sporty driving mode, a water ski driving mode, a comfort mode or an eco driving mode, for example.

Preferably, the actuator encompasses a first releasable connecting means for connecting the actuator to the floating device. It is preferred thereby for the first releasable connecting means to be embodied such that it can be arranged or is arranged, respectively, in the area of the means, which is assigned to the floating device, for controlling the power of the water jet drive of the floating device, so as to connect the actuator to the floating device. For example, the means for controlling the power of the water jet drive of the floating device can be arranged as lever, in particular accelerator, at the handle, for example at the left or right handle of the floating device. The actuator is then arranged in the area of the accelerator at the handle, for example at the left or right handle of the floating device by means of the first releasable connecting means. For example, the first releasable connecting means can be embodied as clamp or band and can be embodied so as to be capable of being placed around the handle of the floating device. The actuator can thus be fastened to the handle by means of one or a plurality of clamps, which are arranged around the left or right handle of the floating device, for example of the jet ski. The actuator can furthermore be connected to the floating device at a different suitable location by means of the first releasable connecting means. For example, the actuator can be arranged at the handlebar, at the handlebar cover, at the body or at the outer jacket of the floating device by means of the first releasable connecting means.

It is furthermore preferred for the first actuating element to encompass a finger, which is substantially embodied so as to be rigid, for operating the means, which is assigned to the floating device, for controlling the power of the water jet drive of the floating device. The first actuating element is thereby preferably embodied for exerting a compressive force on the means, which is assigned to the floating device, for controlling the power of the water jet drive of the floating device. In terms of the instant invention, a rigidly embodied finger is to be understood as a body, which is embodied in an elongate manner, for example a rod, of a suitable material, for example metal or plastic. Due to the fact that the first actuating element is preferably embodied substantially as a rigidly embodied finger as well as for exerting a compressive force on the means, which is assigned to the floating device, for controlling the power of the water jet drive of the floating device, the means for controlling the power of the water jet drive of the floating device can be operated by means of the actuating element in a manner, which is similar or identical to the manner, in which it would typically be operated by a person.

For example, the means for controlling the power of the water jet drive of the floating device can be embodied as lever, in particular as accelerator. By means of the finger, which is substantially embodied so as to be rigid, the accelerator of the floating device can be operated in a substantially continuous manner and the power of the water jet drive of the floating device can thus be determined and specified.

By providing a first actuating element, which is embodied in this manner, it is possible to use the actuator at every known floating device comprising water jet drive, for example at known jet skis or jet boats, without taking retrofitting measures at the floating device. For example, the actuator comprising the first actuating element can thus be arranged in the area of the handle of a jet ski such that a compressive force can be exerted onto the accelerator by means of the actuating element, namely the rigidly embodied finger.

It is furthermore preferred for the first actuating element to be embodied for exerting a tractive force on the means, which is assigned to the floating device, for controlling the power of the water jet drive of the floating device. The first actuating element can thereby be embodied so as to be capable of being connected or can be connected to the means, which is assigned to the floating device, for controlling the power of the water jet drive of the floating device by means of a second releasable connecting means. For example, the means for controlling the power of the water jet drive of the floating device can be embodied as movable machine element, for example Bowden cable. By means of the second releasable connecting means, for example in the form of a clamp or of a hook, the first actuating element can be capable of being connected to the Bowden cable or can be connected thereto, respectively. By exerting a tractive force on the Bowden cable by means of the first actuating element, the power of the water jet drive of the floating device can thus be specified and adjusted. The control of the power of the water jet drive of the floating device is hereby also possible in a substantially continuous manner.

By providing a first actuating element, which is embodied in this manner, of an actuator, the actuator can be connected to known floating devices, for example jet skis or jet boats, without having to take retrofitting measures at the floating device. For example, the actuator can be connected to the first actuating element at the handle of a jet ski with the Bowden cable, which is typically connected to the accelerator. For this purpose, the connection between Bowden cable and accelerator can be interrupted or the first actuating element can be connected to the Bowden cable in addition to the accelerator. Such an arrangement would not need to be disassembled, even if the floating device, for example the jet ski, is used as jet ski again. In the alternative, the first actuating element can be arranged at or in the intake section of an engine of the floating device in the area of a butterfly control valve and can be connected to the butterfly control valve by means of the second releasable connecting means.

It is furthermore preferred for the actuator to encompass an actuating motor, in particular a servomotor or a cable pull motor, for controlling and/or moving the first actuating element. In a particularly preferred manner, the first actuating element is thereby connected to the actuating motor via an arm. The actuating motor, for example the servomotor, can thus specify the lift or the travel or the distance, respectively, across which the accelerator of the floating device is to be pushed or moved, respectively. The first actuating element, for example the rigidly embodied finger, is thus pushed against the accelerator of a jet ski by means of the actuating motor. A tractive force can furthermore be exerted on the means for controlling the power of the water jet drive of the floating device, for example a Bowden cable, by means of the actuating motor, for example a cable pull motor.

The actuator can be arranged and fastened to the floating device, in particular in the area of the means for controlling the power of the water jet drive of the floating device, in any suitable manner. The individual parts of the actuator, for example, electronics, first actuating element and receiver can thereby be arranged at the floating device either individually or connected to one another. However, the actuator preferably encompasses a first mechanical holder for holding the first actuating element and/or an actuating motor. The first mechanical holder thereby encompasses a plurality of, preferably at least three elements, which are connected to one another. For example, one of the elements could be embodied for connecting the first mechanical holder to the floating device, and a second element of the first mechanical holder could be embodied for holding an actuating motor. Provision is thereby made in a particularly preferred manner for the individual elements of the first mechanical holder to be embodied rigidly and of a fixed, non-deformable material. For example, the elements could be embodied from metal or plastic.

Preferably, at least three of the elements of the first mechanical holder, which are connected to one another, are embodied as substantially ashlar-shaped support profiles. On a longitudinal side, a first support profile thereby encompasses at least a first groove for receiving a first support profile connecting means. On a longitudinal side, the second support profile preferably encompasses at least a second groove for receiving a second support profile connecting means. On a longitudinal side, a third support profile further preferably encompasses at least a third groove for receiving the second support profile connecting means. The individual support profile connecting means can thereby be embodied so as to be substantially flat or disk-shaped, respectively. The support profile connecting means further encompass a pin comprising a head, which is arranged at the end thereof and which can be inserted into the grooves, which are arranged at the longitudinal sides of the support profiles. The head, which is arranged at the end of the pin, encompasses a larger diameter than the pin.

On a further longitudinal side, the third support profile preferably encompasses at least a fourth groove and in a particularly preferred manner a fifth groove, which is arranged substantially parallel to the fourth groove. Provision is furthermore made in a preferred manner for the third support profile to encompass a through hole or recess on a longitudinal side for receiving and/or fastening an actuating motor. Provision is thereby made in a particularly preferred manner for the through hole or recess for receiving an actuating motor to be arranged at the same longitudinal side, at which the fourth and, preferably fifth groove are arranged. The actuating motor can thus be fastened in the fourth and fifth groove of the third support profile in a suitable manner by means of further connecting means.

The actuating motor can furthermore be arranged so as to be capable of being displaced in the grooves, namely the fourth and fifth groove of the third support profile by means of suitable fastening means.

On the longitudinal side, which encompasses the first groove, the first support profile is preferably connected to a front side of the second support profile by means of the first support profile connecting means. Provision is thus made in a preferable manner for the second support profile to be connected with a front side on a longitudinal side, namely the longitudinal side, the first groove of the first support profile. In longitudinal direction of the first support profile, the second support profile is thereby arranged so as to be capable of being displaced along the first groove. By means of the displaceable embodiment of the support profiles to one another, the first mechanical holder can be adapted to any shape and to different distances between handle and accelerator of a floating device, for example jet ski, without requiring retrofitting measures having to be taken at the floating device.

On the longitudinal side, which encompasses the second groove, the second support profile is connected to a longitudinal side of the third support profile, which encompasses the third groove, by means of the second support profile connecting means. On a longitudinal side, the second support profile is thus connected to a longitudinal side of the third support profile in a preferred manner. In longitudinal direction of the second support profile, the third support profile is preferably arranged as so as be capable of being displaced along the second groove of the second support profile. Due to this displaceable embodiment, the distance between the first support profile and the third support profile can be varied and can be adapted to the dimensions of the floating device.

Provision is furthermore made in a preferable manner for the first support profile connecting means to be embodied such that the second support profile is arranged on the first support profile so as to be capable of being rotated about its longitudinal axis. In a particularly preferred manner, the second support profile is arranged on the first support profile so as to be capable of being rotated by 360° about its longitudinal axis.

Provision is furthermore made in a preferable manner for the second support profile connecting means to be embodied such that the third support profile can be rotated about its transverse axis. The angle of inclination between the first support profile and the third profile can thus be varied through this and can be adapted to the dimensions of the floating device.

Preferably, the first releasable connecting means for connecting the actuator to the floating device, for example for connecting the actuator to the handle of the floating device, is connected to the first support profile of the first mechanical holder. Provision is made for this purpose in a preferred manner for one or a plurality of clamps to be arranged at a longitudinal side of the support profile.

Preferably, the angle between the first support profile and the second support profile is substantially 90°. The angle between the second support profile and the third support profile can be varied substantially between 0° and 180° by means of the rotatable embodiment of the second support profile connecting means. The third support profile can be arranged parallel to the first support profile. Due to the rotatable embodiment of the second support profile connecting means, however, the angle between the first support profile and the third support profile can also be varied between 0° and 180°

By providing a first mechanical holder consisting of a plurality of, preferably of three support profiles, wherein the individual support profiles can be arranged so as to be displaceable and partially rotatable to one another, the first mechanical holder and thus the actuator can be arranged at every floating device, for example every jet ski, without retrofitting measures at the floating device. In particular, a total of five degrees of freedom or variance options, respectively, can be attained hereby.

For example by providing one or a plurality of clamps as first releasable connecting means for connecting the actuator to the floating device, the first mechanical holder and thus the actuator can be rotatably arranged around the handle of the floating device and can be adjusted. By providing the clamps as first releasable connecting means, the first support profile and thus the actuator can furthermore be arranged so as to be capable of being displaced in longitudinal direction along a handle of the floating device. By means of a displaceably embodied connection between the first support profile and the second support profile, a displaceably embodied arrangement of the actuator along the longitudinal direction of a handle of the floating device is furthermore possible.

Due to the rotatable embodiment of the first support profile connecting means, a rotatability of the first mechanical holder and thus of the actuator can be attained between first support profile and second support about the vertical axis of the first mechanical holder or of the second support profile, respectively.

Due to the displaceable embodiment of the second support profile connecting means between the second support profile and the third profile, the height of the first mechanical holder or the distance of the actuating motor holder to the handle of the floating device, respectively, can be varied and adjusted.

The incline of the first actuating element for example of the finger, which is substantially embodied so as to be rigid, can be varied and adjusted by means of the rotatable embodiment of the second support profile connecting means between the second support profile and the third support profile.

As a whole, a first mechanical holder, which is very flexible and which can be adapted to every floating device, can thus be provided for the actuator. Such a first mechanical holder and thus the actuator can furthermore be connected in the simplest manner to the floating device without any retrofitting measures at the floating device. For example, the first mechanical holder can be arranged at a handle, at a handlebar, at a handlebar cover, at a body or at an outer jacket of the floating device.

Provision is furthermore made in a preferable manner for a signal, which is generated by the means for controlling the power of the water jet drive of the floating device, for controlling the power of the water jet drive of the floating device is received by the first electronic module and is replaced by the signal generated by the first electronic module, in particular voltage signal, and is fed into the engine electronics, which is assigned to the floating device, for controlling the power of the water jet drive of the floating device. In the alternative, provision is preferably made for the signal, which is to be received, to not be generated by the means for controlling the power of the water jet drive of the floating device, but by a sensor, which is assigned to this means. The signal, for example voltage signal, of a gas sensor, namely of a sensor, which generates a voltage signal as a function of the accelerator movement, can thus be caught, for example, and can be replaced by a specifically generated signal. This signal is thereby generated by the electronics of the actuator, based on the control data received by the first operating unit. By providing such a first electronic module, the actuator can be connected to the floating device without massive changes to the cabling of the floating device. For example, the actuator or the electronics of the actuator, respectively, can be inserted as intermediate module, for example plug adapter, in the area of a connector, which is already present, for example of the main connector, underneath a handlebar of a jet ski.

Such a first electronic module could be connected temporarily during the time the floating device is used as drive for a water jet-driven piece of sports equipment. In the alternative, the first electronic module could furthermore also stay connected to the floating device. For this purpose, the first electronic module is preferably embodied such that it can be adjusted, whether the signal, which is generated by the accelerator, which is arranged at the floating device and by a sensor, is fed into the engine electronics for controlling the power of the water jet drive of the floating device, or whether this signal is used for using the floating device as drive for a water jet-driven piece of sports equipment and, based on the control data of the remote operating device, generates a signal and is fed into the engine electronics for controlling the power of the water jet drive of the floating device.

A switch-over and change can thus be made in a simple manner between normal operation and remote controlled operation.

Provision is furthermore made in a preferred manner for the actuator to encompass a second actuating element for mechanically operating a means, which is assigned to the floating device, for controlling a start function and/or stop function of the water jet drive of the floating device. For this purpose, provision can be made for a second mechanical holder for holding the second actuating element and/or for holding a further actuating motor, which is connected to the second actuating element, and to be arranged at the floating device by means of a further releasable connecting means. Preferably, the second mechanical holder can thereby be arranged or is arranged in the area of the means, which is assigned to the floating device, for controlling a start function and/or stop function of the water jet drive of the floating device. For example, the second mechanical holder can be arranged at the left or right handle, at the handlebar, at the handlebar cover, at the body or at the outer jacket of the floating device. The second actuating element is preferably embodied for mechanically operating a push button or switch at the floating device.

The actuator furthermore preferably encompasses a second electronic module for controlling a start function and/or stop function of the water jet drive of the floating device. For this purpose, the second electronic module can be embodied as plug adapter or can be connected to a plug adapter. Preferably, the second electronic module is embodied for generating a voltage signal, for example a 12V voltage, wherein the generated voltage signal can be fed into the engine electronics of the floating device via the plug adapter for turning on/turning off the water jet drive of the floating device.

Not only the desired power of the water jet drive of the floating device can thus be specified and adjusted, but the water jet drive can also be turned on or turned off, respectively. The remote operating device thus encompasses one additional or two additional functions, respectively.

Provision is furthermore made in a preferable manner for the actuator to encompass a third actuating element for mechanically operating a means, which is assigned to the floating device, for controlling an emergency stop function of the water jet drive of the floating device. For this purpose, a cable pull motor can be used, which is retracted in the de-energized state and which removes the securing element, for example a plastic cap or a small plate, from the emergency stop switch of the floating device, for example the jet ski. Provision can thus be made, for example, for an additional actuating motor and a third actuating element, which is connected to this actuating motor, for the emergency stop function. For holding the third actuating element and/or for holding a further actuating motor, which is connected to the third actuating element, provision can be made for a third mechanical holder, which can be arranged at the floating device by means of a further releasable connecting means. Preferably, the third mechanical holder can be or is thereby arranged in the area of the means, which is assigned to the floating device, for controlling an emergency stop function of the water jet drive of the floating device. For example, the third mechanical holder can be arranged at the left or right handle, at the handlebar, at the handlebar cover, at the body or at the outer jacket of the floating device.

The actuator preferably furthermore encompasses a third electronic module for controlling an emergency stop function of the water jet drive of the floating device. For this purpose, the third electronic module can be embodied as plug adapter or can be connected to a plug adapter. Preferably, the third electronic module is embodied for interrupting an electrical line to the emergency stop switch, which is assigned to the floating device.

In addition to controlling the power, controlling the start function and controlling the stop function of the water jet drive of the floating device, the water jet drive of the floating function can be turned off by operating an emergency stop switch at the first operating unit in a remotely controlled manner.

It is furthermore preferred for the actuator to encompass a fourth actuating element for mechanically operating a means, which is assigned to the floating device, for selecting a mode of the water jet drive of the floating device. For example, a driving mode of the floating device can be selected and adjusted via this. For this purpose, provision can be made for a fourth mechanical holder for holding the fourth actuating element and/or for holding a further actuating motor, which is connected to the fourth actuating element, and to be arranged at the floating device by means of a further releasable connecting means. Preferably, the fourth mechanical holder can thereby be arranged or is arranged in the area of the means, which is assigned to the floating device, for selecting a mode of the water jet drive of the floating device. For example, the fourth mechanical holder can be arranged at the left or right handle, at the handlebar, at the handlebar cover, at the body or at the outer jacket of the floating device. The fourth actuating element is preferably embodied for mechanically operating a push button or switch at the floating device.

To select a mode of the water jet drive of the floating device, the actuator can preferably encompass a fourth electronic module. For this purpose, the fourth electronic module can be embodied as plug adapter or can be connected to a plug adapter. Preferably, the fourth electronic module is embodied for varying a voltage at a sensor line, which is assigned to the floating device.

The electronic modules can be embodied as individual modules or can be combined in an electronic module, preferably at least partially or, in a particularly preferred manner, completely. For example, the first electronic module, the second electronic module, the third electronic module and/or the fourth electronic module can be embodied in a single overall electronic module. The first electronic module, the second electronic module, the third electronic module and/or the fourth electronic module could furthermore be arranged in a single plug adapter or could be connected to a single plug adapter. The first electronic module, the second electronic module, the third electronic module and/or the fourth electronic module could furthermore be assigned to different plug adapters. In terms of the invention, a plug adapter is to be understood as a plug, which can be electrically connected at a specified position of one or a plurality of the cables, which are assigned to the floating device. Such a specified position can be an existing plug connection, which is disconnected and the plug adapter is connected therebetween. The plug adapter connects the two disconnected ends of the existing cable at the specified position, wherein the signals/voltages are partially changed or replaced by the electronic module or modules.

All of the actuating elements and/or actuating motors are preferably actuated by the electronics for processing the control data, which are received by the receiver. Provision is preferably furthermore made for all of the electronic modules to be actuated by the electronics for processing the control data, which are received by the receiver.

Provision is furthermore made in a preferable manner for the remote operating device to encompass a second operating unit, in particular in the form of a trainer remote control or of a trainer module. As does the first operating unit, the second operating unit thereby encompasses an emitter for transmitting the control data to the actuator.

By providing a second operating unit in the form of a trainer remote control or of a trainer module, a teacher or trainer can control the water jet-driven piece of sports equipment with a student either completely or partially. Preferably, the second operating unit encompasses at least the same functions as the first operating unit. At least the power of the water jet drive of the floating device, the start function and/or stop function of the water jet drive of the floating device, the emergency stop function of the water jet drive of the floating device as well as the selection of a mode of the water jet drive of the floating device can thus also be controlled or selected, respectively, via the second operating unit.

Provision is furthermore made in a preferred manner for the functions of the first operating unit to be capable of being activated and/or deactivated via the second operating unit. The second operating unit thus encompasses a higher priority as compared to the first operating unit. It is possible through this for the second operating unit to keep complete control and to control all of the functions or to relinquish partial as well as complete control to the first operating unit or to release it to the first operating unit, respectively.

Provision is preferably furthermore made for the second operating unit to encompass additional functions, such as the limitation of the maximum power of the water jet drive of the floating device and/or the limitation of the maximum acceleration and/or delay of the water jet drive of the floating device, for example.

The activation and/or deactivation of the functions of the first operating unit can be made in a preferable manner via a radio contact between the first operating unit and the second operating unit. In addition to the emitter, at least the first operating unit thus also encompasses a receiver. As an alternative or in addition, the activation and/or deactivation of the functions of the first operating unit can be made via the actuator. In this case, the second operating unit transmits activation and/or deactivation data to the actuator or to the electronics of the actuator, respectively.

The provision of a second operating unit comprising additional functions and the possibility of releasing or blocking, respectively, individual functions at the first operating unit, simplifies the handling significantly, in particular in response to training and in response to instructing in the operation of a water jet-driven piece of sports equipment. Such functions thus do not need to be made at the floating device. In addition, the provision of such a second operating unit provides for a safe operation, because in particular maximum accelerations and delays as well as the maximum power can be specified and can be adapted to the abilities of the student.

Provision is thereby made in a preferable manner for the second operating unit to be connected to the actuator by means of an emitter via a cable connection or via a radio contact. The floating device or the water jet drive thereof, respectively, and in particular the power thereof can thus be controlled remotely by means of the second operating unit in the form of a trainer remote control via a radio contact with the actuator. In addition or in the alternative, the second operating unit can be connected to the actuator in the form of a trainer module by means of cables and can be arranged at the floating device. Such a trainer module, in turn, can be controlled remotely or the functions can be adjusted in advance at the trainer module.

Provision is furthermore made in a preferable manner for the first operating unit and/or the second operating unit to not only encompass input means for adjusting the power of the water jet drive of the floating device and/or for adjusting the start function and/or stop function and/or emergency stop function and/or for selecting the mode of the water jet drive of the floating device, but also a display means, for example a monitor, via which the adjusted functions as well as further vehicle data, such as speed, revolutions per minute or further information can be displayed.

Although several particular embodiments of the invention have been described in detail for purposes of illustration, various modifications may be made without departing from the spirit and scope of the invention. Accordingly, the invention is not to be limited, except as by the appended claims.

The invention claimed is:

1. A remote operating device for remotely operating a floating device having a water jet drive for generating a water jet, the remote operating device comprising:
   a first operating unit for receiving control data and an actuator for controlling and/or adjusting power of the water jet drive;
   wherein the first operating unit comprises an emitter for transmitting the control data, and the actuator comprises a receiver for receiving the control data transmitted by the emitter;

the actuator further comprising a first actuating element for mechanically operating a means, which is assigned to the floating device, for controlling the power of the water jet drive;

wherein the means, which is assigned to the floating device, for controlling the power of the water jet drive of the floating device, comprises a Bowden cable; and wherein the first actuating element exerts a tractive force on the Bowden cable, wherein the first actuating element is connected to the Bowden cable by means of a first releasable connecting means.

2. The remote operating device according to claim 1, wherein the emitter and the receiver are embodied for a cable connection or for a radio contact.

3. The remote operating device according to claim 1, wherein the actuator comprises an electrical system for processing the control data received by the receiver.

4. The remote operating device according to claim 1, wherein the control data comprises information relating to the power of the water jet drive, which is to be adjusted, as well as further information relating to a start function and/or a stop function and/or an emergency stop function and/or of a change between different driving modes of the floating device.

5. The remote operating device according to claim 1, wherein the actuator comprises a second releasable connecting means for connecting the actuator to the floating device in the area of the means, which is assigned to the floating device, for controlling the power of the water jet drive of the floating device.

6. The remote operating device according to claim 1, wherein the first actuating element comprises a rigid finger for operating the means, which is assigned to the floating device, for controlling the power of the water jet drive, wherein the first actuating element exerts a compressive force on the means, which is assigned to the floating device, for controlling the power of the water jet drive.

7. The remote operating device according to claim 1, wherein the actuator comprises a servomotor or a cable pull motor, for actuating and/or moving the first actuating element, wherein the first actuating element is connected to the actuating motor via an arm.

8. The remote operating device according to any of claims 1-4, 5-6 or 7, wherein the actuator comprises a first mechanical holder for holding the first actuating element and/or an actuating motor, wherein the first mechanical holder comprises at least three elements which are connected to one another.

9. The remote operating device according to claim 8, wherein the at least three of the elements of the first mechanical holder are embodied as substantially ashlar-shaped support profiles, wherein on a longitudinal side a first support profile comprises at least a first groove for receiving a first support profile connecting means, wherein on a longitudinal side a second support profile comprises at least a second groove for receiving a second support profile connecting means, and wherein on a longitudinal side a third support profile comprises at least a third groove for receiving the second support profile connecting means.

10. The remote operating device according to claim 9, wherein on a further longitudinal side the third support profile comprises a fourth groove, and a fifth groove which is arranged substantially parallel to the fourth groove, and/or a through hole for receiving the actuating motor.

11. The remote operating device according to claim 9, wherein on the longitudinal side which encompasses the first groove, the first support profile is connected to a front side of the second support profile by means of the first support profile connecting means, wherein, in longitudinal direction of the first support profile, the second support profile is arranged so as to be displaceable along the first groove.

12. The remote operating device according to claim 9, wherein on the longitudinal side which encompasses the second groove, the support profile is connected to a longitudinal side of the third support profile which encompasses the third groove, by means of the second support profile connecting means, wherein the third support profile is arranged so as to be displaceable in longitudinal direction of the second support profile along the second groove.

13. The remote operating device according to claim 9, wherein the first support profile connecting means is embodied such that the second support profile can be rotated about its longitudinal axis.

14. The remote operating device according to claim 9, wherein the second support profile connecting means is embodied such that the third support profile can be rotated about its transverse axis.

15. The remote operating device according to any of claims 1-3, 5-6 or 7, wherein the actuator comprises a second actuating element for mechanically operating a start/stop device, which is assigned to the floating device, for controlling a start function and/or stop function of the water jet drive, and wherein the actuator comprises a third actuating element for mechanically operating an emergency stop device, which is assigned to the floating device, for controlling an emergency stop function of the water jet drive, and wherein the actuator comprises a fourth actuating element for mechanically operating a drive mode selection device, which is assigned to the floating device, for selecting a driving mode of the water jet drive.

16. The remote operating device according to any one of claims 1-3, 5-6 or 7, wherein the actuator comprises a second electronic module for controlling a start function and/or stop function of the water jet drive and wherein the actuator comprises a third electronic module for controlling an emergency stop function of the water jet drive, and wherein the actuator further comprises a fourth electronic module for selecting a driving mode, of the water jet drive.

17. The remote operating device according to any one of claims 1, 3, 4, 5-6 or 7, wherein the remote operating device comprises a second operating unit for receiving control data, wherein the second operating unit is connected to the actuator by means of a cable connection and/or radio contact for transmitting control data for controlling and/or adjusting the power of the water jet drive.

18. The remote operating device according to claim 16, wherein the second operating unit has a higher priority than the first operating unit, wherein individual functions of the first operating unit can be activated and/or deactivated by the second operating unit.

19. A remote operating device for remotely operating a floating device having a water jet drive for generating a water jet, the remote operating device comprising:

a first operating unit for receiving control data and an actuator for controlling and/or adjusting power of the water jet drive;

wherein the first operating unit comprises an emitter for transmitting the control data, and the actuator comprises a receiver for receiving the control data transmitted by the emitter;

the actuator further comprising either a first actuating element for mechanically operating a means, which is assigned to the floating device, for controlling the power of the water jet drive or a first electronic module for feeding a voltage signal into an engine electronics, for controlling the power of the water jet drive;

wherein the actuator comprises a first mechanical holder for holding the first actuating element and/or an actuating motor, wherein the first mechanical holder comprises at least three elements which are connected to one another; and wherein the at least three of the elements of the first mechanical holder are embodied as substantially ashlar-shaped support profiles, wherein on a longitudinal side a first support profile comprises at least a first groove for receiving a first support profile connecting means, wherein on a longitudinal side a second support profile comprises at least a second groove for receiving a second support profile connecting means, and wherein on a longitudinal side a third support profile comprises at least a third groove for receiving the second support profile connecting means.

20. The remote operating device according to claim 19, wherein on a further longitudinal side the third support profile comprises a fourth groove, and a fifth groove which is arranged substantially parallel to the fourth groove, and/or a through hole for receiving the actuating motor.

21. The remote operating device according to claim 19, wherein on the longitudinal side which encompasses the first groove, the first support profile is connected to a front side of the second support profile by means of the first support profile connecting means, wherein, in longitudinal direction of the first support profile, the second support profile is arranged so as to be displaceable along the first groove.

22. The remote operating device according to claim 19, wherein on the longitudinal side which encompasses the second groove, the support profile is connected to a longitudinal side of the third support profile which encompasses the third groove, by means of the second support profile connecting means, wherein the third support profile is arranged so as to be displaceable in longitudinal direction of the second support profile along the second groove.

23. The remote operating device according to claim 19, wherein the first support profile connecting means is embodied such that the second support profile can be rotated about its longitudinal axis.

24. The remote operating device according to claim 19, wherein the second support profile connecting means is embodied such that the third support profile can be rotated about its transverse axis.

* * * * *